(12) United States Patent
Bissontz

(10) Patent No.: US 8,219,273 B2
(45) Date of Patent: Jul. 10, 2012

(54) ENGINE STARTING CONTROL FOR HYBRID ELECTRIC POWERTRAINS

(75) Inventor: Jay E Bissontz, Fort Wayne, IN (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 17 days.

(21) Appl. No.: 12/960,025

(22) Filed: Dec. 3, 2010

(65) Prior Publication Data

US 2012/0143412 A1 Jun. 7, 2012

(51) Int. Cl.
*F02N 11/00* (2006.01)
(52) U.S. Cl. .......................... 701/22; 701/113; 180/65.8
(58) Field of Classification Search ........................ None
See application file for complete search history.

(56) References Cited

U.S. PATENT DOCUMENTS

| | | | |
|---|---|---|---|
| 6,018,199 A * | 1/2000 | Shiroyama et al. | 290/37 A |
| 7,104,920 B2 * | 9/2006 | Beaty et al. | 477/5 |
| 7,617,808 B2 * | 11/2009 | Aswani et al. | 123/179.3 |
| 7,641,018 B2 | 1/2010 | Bissontz | |
| 2008/0132378 A1 * | 6/2008 | Bouchon | 477/3 |
| 2010/0304924 A1 * | 12/2010 | Bucknor et al. | 477/5 |

* cited by examiner

*Primary Examiner* — Michael J. Zanelli
(74) *Attorney, Agent, or Firm* — Jeffrey P. Calfa; Mark C. Bach

(57) ABSTRACT

A method of starting an internal combustion engine of a vehicle with a hybrid-electric powertrain having an internal combustion engine, a generator, and a high-voltage battery pack, is provided. An internal combustion engine start input signal is received. A load on an electric motor and generator is determined. The internal combustion engine receives torque transmitted from the electric motor and generator when the load on the electric motor and generator is below a predetermined load threshold. The internal combustion engine receives torque from an exogenous starting device when the load on the electric motor and generator is above the predetermined load threshold.

13 Claims, 4 Drawing Sheets

US 8,219,273 B2

ENGINE STARTING CONTROL FOR HYBRID ELECTRIC POWERTRAINS

TECHNICAL FIELD

The present disclosure relates to a control system and method for a hybrid-electric powertrain, and more particularly to a control system and method for a hybrid-electric powertrain that controls a source of torque for starting an internal combustion engine of a vehicle having the hybrid-electric powertrain.

BACKGROUND

Many vehicles now utilize hybrid-electric powertrains in order to increase the efficiency of the vehicle. Hybrid-electric powertrains typically improve overall vehicle fuel efficiency by supplementing an internal combustion engine with electric motors, such that less power output is required of the internal combustion engine, as power from the electric motors may also be utilized in situations when maximum powertrain output is required, such as acceleration, or climbing a grade. Additionally, hybrid-electric powertrains may be utilized to power equipment mounted to a vehicle, such as, for example, a lift, an auger, a post hole digger, a crane, or other known equipment that may be utilized when a vehicle is not in motion. Such power equipment may be powered through a power take off ("PTO") that may be driven by electric motors of the hybrid-electric powertrain to reduce the time an internal combustion engine is operated. For instance, if torque required to operate the equipment mounted to the vehicle is generally low, or the equipment is only used intermittently, it is contemplated that only the electric motors may be utilized. However, if the torque demand of the equipment is high, or the equipment is used for a prolonged period, the internal combustion engine may be used in place of, or in addition to, the electric motors to power the equipment.

If the hybrid-electric powertrain is providing power to the PTO from electric motors, and conditions are such that power is also required from the internal combustion engine, a source of torque to power a starter of the internal combustion engine is required. The source of torque to start the internal combustion engine provides issues not experienced in conventional vehicles, as a battery would simply provide electrical power to a starter motor that was utilized to start the internal combustion engine. However, in many hybrid-electric powertrains, an electric motor and generator is used to power the starter, or to simply turn the crankshaft of the internal combustion engine. However, if a battery pack powering the electric motor and generator does not have sufficient charge, the internal combustion engine may not be stared. Another situation that may prevent the electric motor and generator from providing torque to start the internal combustion engine is when the electric motor and generator is providing continuous power to the equipment mounted to the vehicle. In such a situation, the electric motor and generator may not have sufficient torque to both power the equipment and start the engine, thus, the torque to the equipment would be reduced while the engine is being started. This may result in unacceptable performance, as the equipment may have to temporarily turn off.

Therefore, a need exists for a system that provides an alternative source to provide torque to start an internal combustion engine, and method of determining when the alternative source to provide torque should be utilized.

SUMMARY

According to one process, a method of starting an internal combustion engine of a vehicle with hybrid-electric powertrain having an internal combustion engine, a generator, and a high-voltage battery pack, is provided. An internal combustion engine start input signal is received. A load on an electric motor and generator is determined. The internal combustion engine receives torque transmitted from the electric motor and generator when the load on the electric motor and generator is below a predetermined load threshold. The internal combustion engine receives torque from an exogenous starting device when the load on the electric motor and generator is above the predetermined load threshold.

According to one embodiment, a hybrid-electric powertrain comprises an internal combustion engine, an electric motor and generator, an exogenous starting device, and an electronic control system. The electric motor and generator couples to the internal combustion engine to both receive torque from the internal combustion engine and to transmit torque to the internal combustion engine. The exogenous starting device couples to the internal combustion engine. The electronic control system is in communication with the internal combustion engine, the electric motor and generator, and the exogenous starting device. The electronic control system includes logic to initiate one of the electric motor and generator and the exogenous starting device to supply torque to the internal combustion engine to start the internal combustion engine.

According to another embodiment, a physical computer program product, comprises a computer usable medium that has an executable computer readable program code embodied therein. The executable computer readable program code implements a method of starting an internal combustion engine of a vehicle with a hybrid-electric powertrain having an internal combustion engine, a generator, and a high-voltage battery pack. The method receives an internal combustion engine start input signal. A load on an electric motor and generator is determined. A state of charge of a high-voltage battery pack is determined. The internal combustion engine receives torque from the electric motor and generator when the load on the electric motor and generator is below a predetermined load threshold and the state of charge of the high-voltage battery pack is above a predetermined charge level. The internal combustion engine receives torque from an exogenous starting device when one of the load on the electric motor and generator is above the predetermined load threshold and the state of charge of the high-voltage battery pack is below a predetermined charge level.

DETAILED DESCRIPTION

Figure 1:
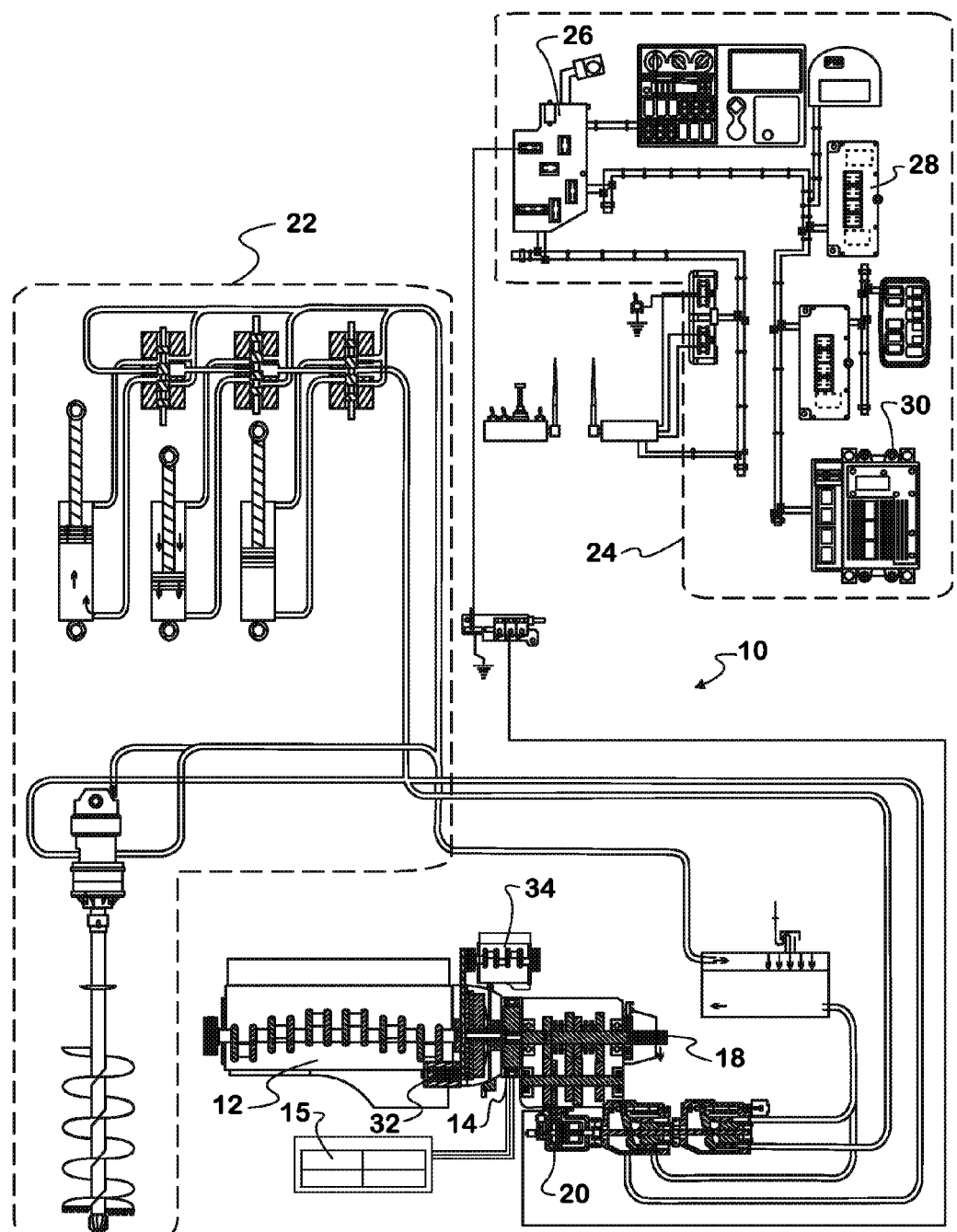
FIG. 1 is a schematic diagram showing a vehicle having a hybrid-electric powertrain.

Referring now to the figures and in particular to FIG. 1, a schematic diagram of a vehicle having a hybrid-electric powertrain 10 is depicted. The hybrid-electric powertrain 10 comprises an internal combustion engine 12 and a hybrid-electric system 14 that is coupled to the internal combustion engine 12. The hybrid-electric system 14 may comprise an electric motor and generator adapted to function as a generator and generate electrical power when being driven by the internal combustion engine, and also is capable of functioning as an electric motor when being powered by a high-voltage battery pack 15. The electric motor and generator is also adapted to function as a starter to provide torque to crank the internal combustion engine 12 during at least some of the times the internal combustion engine 12 is started. The term "crank" as used herein means to provide torque to a crankshaft of the internal combustion engine to rotate the crankshaft while the internal combustion engine is being started, that is prior to combustion of fuel within cylinders of the engine providing torque to rotate the crankshaft. A hybrid motor controller coupled to the hybrid-electric system 14 to control the function of the hybrid-electric system 14 as either a motor, a generator, or a starter.

The internal combustion engine 12 and the hybrid-electric system 14 may both provide torque to transmission 18. The transmission 18 includes a power take off ("PTO") 20. The PTO 20 allows body equipment 22 to be powered by either the internal combustion engine 12 or the hybrid-electric system 14. The PTO 20 may power hydraulic pumps, air compressors, or the like, to provide a source of power for the body equipment 22. The body equipment 22 may include, but is not limited to, hydraulic motors, a man lift, a crane, an augur, a post hole digger, and other devices.

During operation of the hybrid-electric powertrain 10, situations arise where the power to the transmission 18 is being provided solely by the hybrid-electric system 14 and a control system 24 that comprises an electronic system controller ("ESC") 26, a hybrid control module ("HCM") 28, and an electronic control module ("ECM") 30 determines that the internal combustion engine 12 needs to be started to deliver power to the hybrid-electric powertrain 10. For example, it may be determined that torque requirements of the body equipment 22 exceed the torque output of the hybrid-electric system 14, or that the high-voltage battery pack 15 has a state of charge that will not allow the hybrid-electric system 14 to continue to power the body equipment 22. In such a situation, the internal combustion engine 12 is started to provide torque to the body equipment.

In order to start the internal combustion engine 12, torque is supplied to crank the internal combustion engine 12 until fuel combustion within the internal combustion engine 12 is initiated. Once the control system 24 determines that the internal combustion engine 12 needs to be started, the control system monitors a state of charge of the high-voltage battery pack 15. The control system 24 determines whether the high-voltage battery pack 15 contains a sufficient charge to utilize the hybrid-electric system as a starter to provide torque to crank the internal combustion engine 12. The control system 24 also monitors the torque output of the hybrid-electric system 14 being used to power the PTO 20 and the body equipment 22. The control system 24 determines if the hybrid-electric system 14 can generate sufficient torque to continue to power the PTO 20 and crank the internal combustion engine 12. If the control system 24 determines that the high-voltage battery pack 15 has a charge above a predefined level, and that the hybrid-electric system 14 can generate sufficient torque to continue to power the PTO 20 and to crank the internal combustion engine 12, the hybrid-electric system 14 is used as a starter to provide torque to crank and start the internal combustion engine 12.

However, if the control system 24 determines that either the charge of the battery pack 15 is below the predefined level, or that the hybrid-electric system 14 can not generate sufficient torque to continue to power the PTO 20 and crank the internal combustion engine, the control system 24 activates an exogenous starting device 32, 34 to crank the internal combustion engine 12. It is contemplated that only one exogenous starting device is required, however, FIG. 1 shows a first exogenous starting device 32 that is an electric motor that is powered by a battery separate from the high-voltage battery pack 15, and a second exogenous starting device 34 that has an internal combustion engine. It is also contemplated that other types of exogenous starting devices may be used, such as hydraulic motors, devices that utilize compressed gas, devices that utilize heated gas, electric machines, turbines, and the like.

While the control system 24 is designed to make a determination of whether to utilize the hybrid-electric system 14 or one of the exogenous starting devices 32, 34 to crank the internal combustion engine 12, it is also contemplated that a vehicle operator may also make a determination to utilize the exogenous starting devices 32, 34. For instance, if the body equipment 22 is man lift, the operator may feel more comfortable utilizing the exogenous starting device 32, 34 to crank the internal combustion engine 12 if the operator wants to ensure that operation of the body equipment 22 continues as expected.

Thus, during normal operation, the control system 24 utilizes the hybrid-electric system 14 to provide torque to crank the internal combustion engine 12 when the high-voltage battery pack 15 has a charge above a predefined limit, and the hybrid-electric system 14 is capable of generating sufficient torque to both power the PTO 20 and to crank the internal combustion engine 12. However, if either the charge level of the high-voltage battery pack 15 is below the predefined limit, or the hybrid-electric system 14 is not capable of producing sufficient torque to both power the PTO 20 and crank the internal combustion engine 12, one of the exogenous starting devices 32, 34 is utilized to provide torque to crank the internal combustion engine 12.

In addition, the control system 24 may utilize one of the exogenous starting devices 32, 34 if a fault is detected in the hybrid-electric system 14, and thereby, the operation of the hybrid-electric system 14 is discontinued, and the internal combustion engine 12 is solely utilized to power the transmission 18 and the PTO 20.

Figure 2:
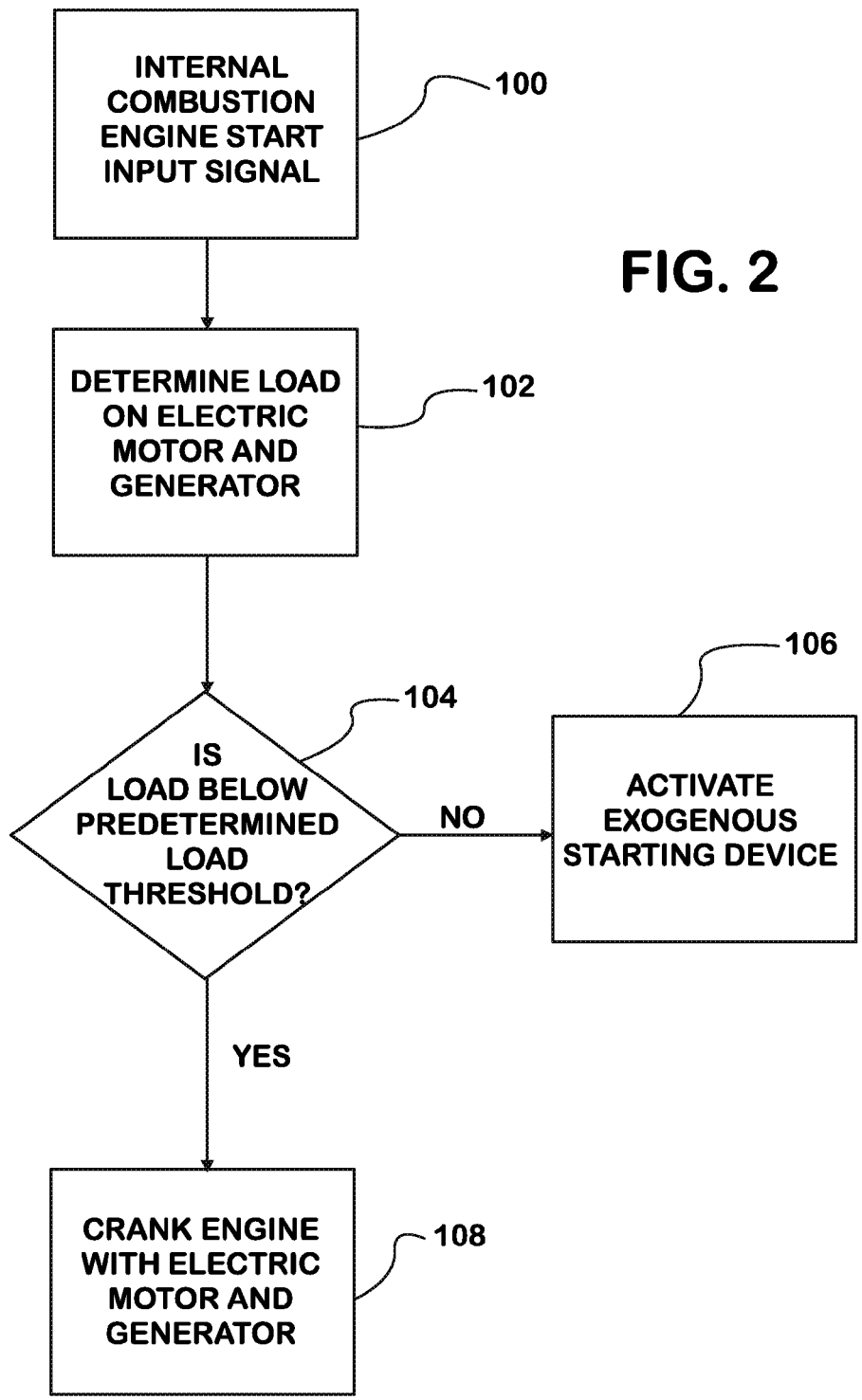
FIG. 2 is a flow chart showing one method of starting an internal combustion engine according to one process.

FIG. 2 shows a flow chart depicting a first method of determining whether to utilize the hybrid-electric system 14 to start the internal combustion engine, or one of the exogenous starting devices 32, 34. An internal combustion engine start request signal is generated at step 100. The engine start request signal 100 may be generated by the control system 24 of the hybrid-electric powertrain 10, or may be provided by an operator or user of the hybrid-electric powertrain. A torque demand on the hybrid-electric system is determined at step 102. The method determines if the torque demand on the hybrid-electric system is below a predetermined threshold at step 104. The predetermined threshold may be a value selected based on an amount of torque required to crank the internal combustion engine, and provide some level of excess torque above what the hybrid-electric system 14 is providing to power the transmission 18 and the PTO 20, such that the hybrid-electric system 14 will be capable of starting the internal combustion engine and powering the transmission 18 and PTO 20. If the torque demand on the hybrid-electric system is not below the predetermined threshold, step 106 activates an exogenous starting device to crank the internal combustion engine. However, if the torque demand on the hybrid-electric system is below the predetermined threshold, the hybrid-electric system is used to crank the internal combustion engine, as shown at step 108.

Figure 3:
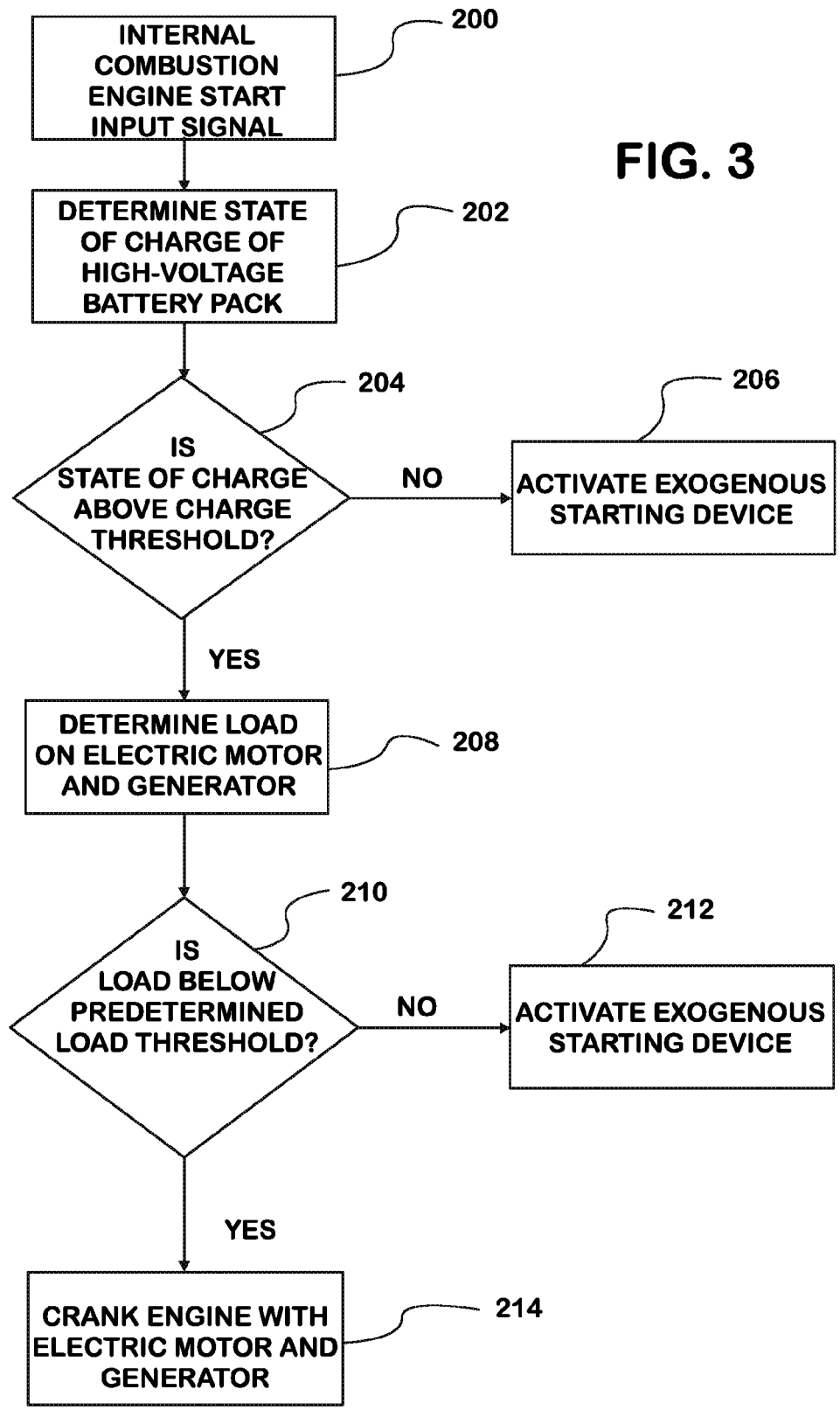
FIG. 3 is a flow chart showing one method of starting an internal combustion engine according to another process.

A flow chart of another method for determining whether to utilize the hybrid-electric system 14 to start the internal combustion engine, or one of the exogenous starting devices 32, 34 is shown in FIG. 3. An internal combustion engine start request signal is generated at step 200. A state of charge of the high-voltage battery pack is determined at step 202. The method determines if the state of charge of the high-voltage battery pack is above a predetermined threshold at step 204. If the state of charge of the high-voltage battery pack is not above the predetermined threshold, an exogenous starting device is activated at step 206. If the state of charge of the high-voltage battery pack is above the predetermined threshold, the method determines a torque demand on the hybrid-electric system at step 208. The method determines if the torque demand on the hybrid-electric system is below a predetermined threshold at step 210. If the torque demand on the hybrid-electric system is not below the predetermined threshold, step 212 activates an exogenous starting device to crank the internal combustion engine. However, if the torque demand on the hybrid-electric system is below the predetermined threshold, the hybrid-electric system is used to crank the internal combustion engine, as shown at step 214.

Figure 4:
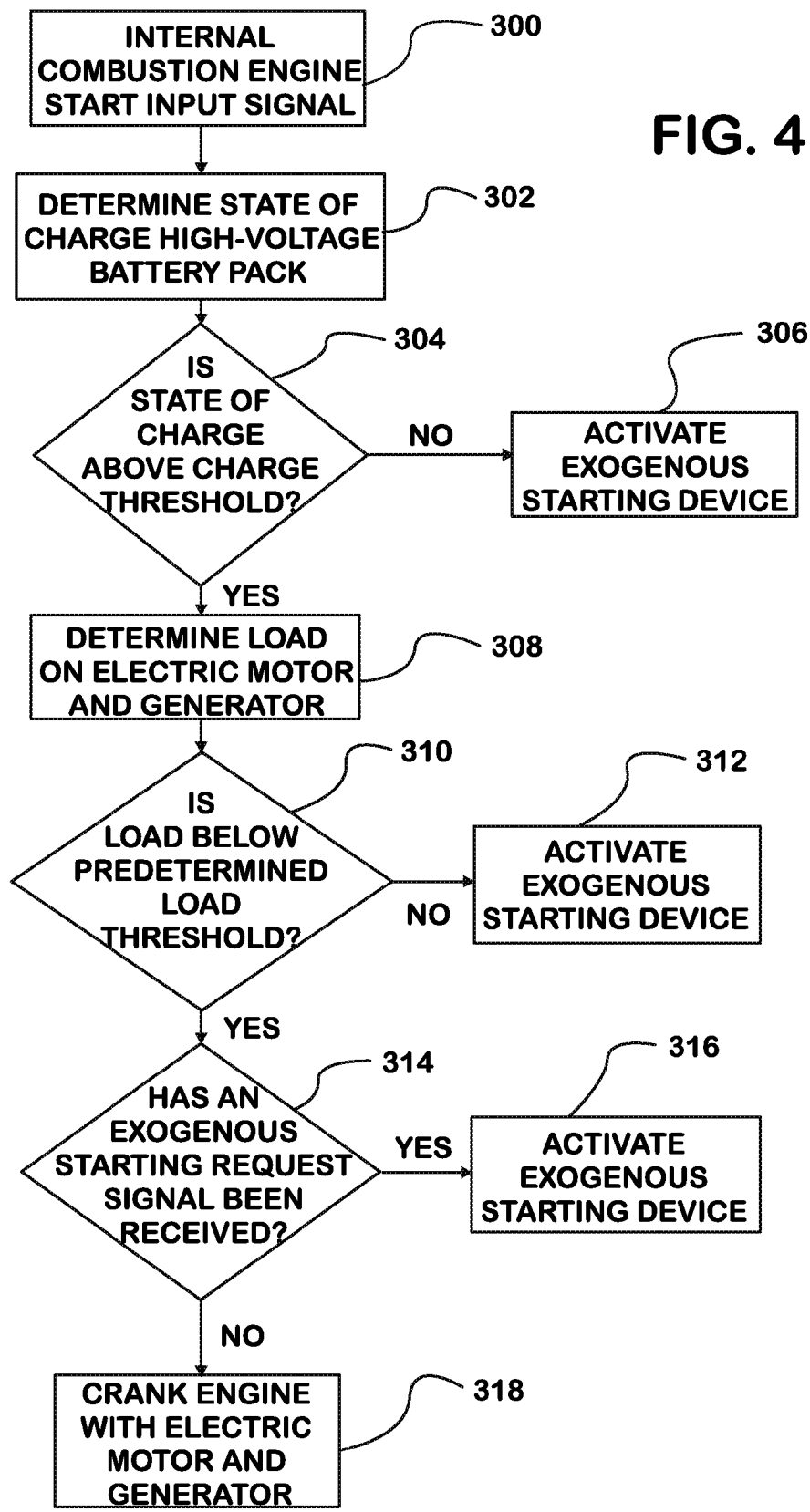
FIG. 4 is a flow chart showing one method of starting an internal combustion engine according to a further process.

FIG. 4 shows a flow chart of a further method for determining whether to utilize the hybrid-electric system 14 to start the internal combustion engine, or one of the exogenous starting devices 32, 34. An internal combustion engine start request signal is generated at step 300. A state of charge of the high-voltage battery pack is determined at step 302. The method determines if the state of charge of the high-voltage battery pack is above a predetermined threshold at step 304. If the state of charge of the high-voltage battery pack is not above the predetermined threshold, an exogenous starting device is activated at step 306 to crank the internal combustion engine. If the state of charge of the high-voltage battery pack is above the predetermined threshold, the method determines a torque demand on the hybrid-electric system at step 308. The method determines if the torque demand on the hybrid-electric system is below a predetermined threshold at step 310. If the torque demand on the hybrid-electric system is not below the predetermined threshold, step 312 activates an exogenous starting device to crank the internal combustion engine. If the torque demand on the hybrid-electric system is below the predetermined threshold, the method determines if a user supplied exogenous starting device activation signal has been provided at step 314. If a user supplied exogenous starting device activation signal was supplied, step 316 activates an exogenous starting device to crank the internal combustion engine. However, if no user supplied exogenous starting device activation signal was provided, the hybrid-electric system is used to crank the internal combustion engine, as shown at step 318.

It will be understood that a control system may be implemented in hardware to effectuate the method. The control system can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

When the control system is implemented in software, it should be noted that the control system can be stored on any computer readable medium for use by or in connection with any computer related system or method. In the context of this document, a computer-readable medium can be any medium that can store, communicate, propagate, or transport the program for use by or in connection with the instruction execution system, apparatus, or device. The computer readable medium can be, for example, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). The control system can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

What is claimed is:

1. A method of starting an internal combustion engine of a vehicle with a hybrid-electric powertrain having an internal combustion engine, a generator, and a high-voltage battery pack, the method comprising:
   receiving an internal combustion engine start input signal;
   determining a load on a electric motor and generator;
   transmitting torque to the internal combustion engine with torque from the electric motor and generator when the load on the electric motor and generator is below a predetermined load threshold;
   transmitting torque to the internal combustion engine with torque from an exogenous starting device when the load on the electric motor and generator is above the predetermined load threshold;
   determining a state of charge of a high-voltage battery pack;
   transmitting torque to the internal combustion engine with torque from the electric motor and generator when the state of charge of the high-voltage battery pack is above a predetermined charge level threshold; and
   transmitting torque to the internal combustion engine with torque from the exogenous starting device when the state of charge of the high-voltage battery pack is below the predetermined charge level threshold.

2. The method of claim 1 further comprising:
   determining if an exogenous starting device request signal has been received;
   transmitting torque to the internal combustion engine from the electric motor and generator when no exogenous starting device request signal has been received; and
   transmitting torque to the internal combustion engine from the exogenous starting device when the exogenous starting device request signal has been received.

3. The method of claim 1, further comprising:
   determining if an exogenous starting device request signal has been received;
   transmitting torque to the internal combustion engine from the electric motor and generator when no exogenous starting device request signal has been received; and
   transmitting torque to the internal combustion engine from the exogenous starting device when the exogenous starting device request signal has been received.

4. The method of claim 1, wherein the predetermined load threshold is based upon an amount of torque required to rotate a crankshaft of the internal combustion engine.

5. The method of claim 1, wherein the predetermined load threshold is based upon operation of body mounted equipment powered by the hybrid-electric powertrain.

6. A hybrid-electric powertrain comprising:
   an internal combustion engine;

an electric motor and generator coupled to the internal combustion engine, the electric motor and generator provided to receive torque from the internal combustion engine and to transmit torque to the internal combustion engine;

an exogenous starting device coupled to the internal combustion engine;

an electronic control system in communication with the internal combustion engine, the electric motor and generator, and the exogenous starting device, the electronic control system including logic to initiate one of the electric motor and generator and the exogenous starting device to supply torque to the internal combustion engine to start the internal combustion engine, wherein the exogenous starting device comprises a second internal combustion engine.

7. The hybrid-electric powertrain of claim 6, further comprising a second exogenous starting device.

8. The hybrid-electric powertrain of claim 7, wherein the second exogenous starting device comprises an electric motor.

9. The hybrid-electric powertrain of claim 7, wherein the second exogenous starting device comprises a hydraulic motor.

10. The hybrid-electric powertrain of claim 7, wherein the second exogenous starting device comprises an electric motor, and the exogenous starting device comprises a second internal combustion engine.

11. A physical computer program product, comprising a computer usable medium having an executable computer readable program code embodied therein, the executable computer readable program code for implementing a method of starting an internal combustion engine of a vehicle with hybrid-electric powertrain having an internal combustion engine, a generator, and a high-voltage battery pack, the method comprising the steps of:

receiving an internal combustion engine start input signal;

determining a load on an electric motor and generator;

determining a state of charge of a high-voltage battery pack;

providing torque to the internal combustion engine from the electric motor and generator when the load on the electric motor and generator is below a predetermined load threshold and the state of charge of the high-voltage battery pack is above a predetermined charge level;

providing torque to the internal combustion engine with torque from an exogenous starting device when one of the load on the electric motor and generator is above the predetermined load threshold and the state of charge of the high-voltage battery pack is below a predetermined charge level, wherein the predetermined charge level is based upon an amount of torque required to rotate a crankshaft of the internal combustion engine.

12. The method of claim 11, wherein the predetermined load threshold is based upon an amount of torque required to rotate a crankshaft of the internal combustion engine.

13. The method of claim 11, wherein the predetermined load threshold is based upon operation of body mounted equipment powered by the hybrid-electric powertrain.

* * * * *